(12) United States Patent
Huang

(10) Patent No.: US 10,508,916 B2
(45) Date of Patent: Dec. 17, 2019

(54) LASER LEVEL

(71) Applicant: Cheng-Hsiung Huang, Taipei (TW)

(72) Inventor: Cheng-Hsiung Huang, Taipei (TW)

(*) Notice: Subject to any disclaimer, the term of this patent is extended or adjusted under 35 U.S.C. 154(b) by 166 days.

(21) Appl. No.: 15/928,243

(22) Filed: Mar. 22, 2018

(65) Prior Publication Data

US 2019/0293422 A1 Sep. 26, 2019

(51) Int. Cl.
*G01C 15/00* (2006.01)
*G01C 9/02* (2006.01)
*G01C 9/24* (2006.01)

(52) U.S. Cl.
CPC .............. *G01C 15/004* (2013.01); *G01C 9/02* (2013.01); *G01C 9/24* (2013.01)

(58) Field of Classification Search
CPC ............................ G01C 15/004; G01C 15/008
USPC ....... 33/275 R, 286, 290, 354, 379, 381, 1 N
See application file for complete search history.

(56) References Cited

U.S. PATENT DOCUMENTS

| | | | | |
|---|---|---|---|---|
| 5,167,075 A * | 12/1992 | Weldy | ..................... | G01C 9/34 33/343 |
| 5,568,265 A * | 10/1996 | Matthews | .............. | G01B 11/27 33/286 |
| 5,604,987 A * | 2/1997 | Cupp | .................... | G01C 15/008 33/275 R |
| 5,784,792 A | 7/1998 | Smith | | |
| 5,842,282 A * | 12/1998 | Ting | ..................... | G01C 15/008 33/227 |
| 5,894,675 A * | 4/1999 | Cericola | .................. | B43L 7/12 33/286 |
| 6,532,676 B2 * | 3/2003 | Cunningham | ....... | G01C 15/008 33/286 |
| 6,986,209 B2 * | 1/2006 | Cook | .................... | G01C 15/008 33/286 |
| 7,055,252 B2 * | 6/2006 | Wu | ......................... | G01C 15/00 33/286 |
| 7,269,907 B2 * | 9/2007 | Levine | .................. | G01C 15/004 248/183.2 |
| 7,346,847 B2 * | 3/2008 | Etter | ....................... | B23B 25/06 33/286 |
| 7,530,175 B2 | 5/2009 | Strutt et al. | | |
| 7,832,113 B1 * | 11/2010 | Richins | .................... | G01C 9/18 33/374 |
| 8,893,395 B2 * | 11/2014 | Mickow | ............... | G01C 15/002 33/286 |
| 9,052,191 B1 | 6/2015 | Keate | | |
| 2006/0213069 A1 * | 9/2006 | Martin | .................... | G01B 3/563 33/286 |
| 2019/0285414 A1 * | 9/2019 | Doeren | ................ | G01C 15/004 |

* cited by examiner

*Primary Examiner* — George B Bennett
(74) *Attorney, Agent, or Firm* — Bacon & Thomas, PLLC

(57) ABSTRACT

The present invention discloses a laser level, which includes a top surface and a bottom surface parallel to each other, and a main body to be installed with a plurality of vials. One end of said main body has an integrally extended configuration of a base. Said base is pivotally connected to one end of a connector, while the other end of said connector is bound with a laser module, so that the laser module can rotate freely around the pivot between the connector and the base to adjust the projection angle of the laser beam.

6 Claims, 4 Drawing Sheets

LASER LEVEL

BACKGROUND OF INVENTION

1. Field of the Invention

The present invention relates generally to a level, and more particularly to a multi-functional laser level which is a combination of a laser module and a level.

2. Description of Related Art

Levels are mainly used by professionals in such industries as civil engineering, plumbing or interior decoration to inspect the flatness, straightness, or verticality of various work pieces, or to inspect the levelness of equipment installation. There are various types of levels. But the most popular one is bubble vial level, which is commonly used and favored by professional. Made of glass, the level vial has a curved inner wall. With liquid filled inside the vial, when the level is tilted, the bubble inside the vial will move toward the rising end. By checking the position of the bubble, the horizontal position can be determined. Apart from the basic measuring function, the above-mentioned level can be combined with auxiliary functions like LED illumination, measure tape, or laser etc. Such multi-functional levels have gradually become dominant in the market.

One example is Chinese Patent No. 200510077352.8 titled "Multi-beam laser level", installed with two laser modules and one prism to generate laser beams on the X-axis, Y-axis and Z-axis.

Another example is the U.S. Pat. No. 5,784,792 titled "Handheld laser level", where a laser module is fitted inside the level at one end just like a battery is fitted into a torch.

Another example is the U.S. Pat. No. 9,052,191 titled "Multi-functional level", where a band tape is configured on one end of the level, and a laser rangefinder is configured on the other end.

A further example is the U.S. Pat. No. 7,530,175 titled "Twin level", which includes two levels combined together like a drawer, with a laser module configured on the second level.

The levels disclosed in the above examples are all configured with laser modules to provide laser beam projection for the function of position measurement. However, such laser modules are all configured on a fixed position. Thus, when it is needed to change the laser beam from the horizontal direction to the vertical direction or to the direction at the angle of 45 degrees, the only way is to move the level from the horizontal position to the vertical position or to the position at the angle of 45 degrees. In another word, the projection angle of the laser beam is limited by the position of the level and cannot be adjusted.

SUMMARY OF THE INVENTION

The present invention is provided by level professionals to solve the problem of the above-mentioned laser level which has a limitation that the laser beam projection angle must be consistent with the direction of the level. The present invention has been generated after constant researches and improvements and continuous trials and efforts.

The main objective of the present invention is to provide a laser level, with a laser module pivotally connected on one end of the level. No matter in which direction the level is placed, the laser module can rotate independently around the pivot to adjust the projection angle. In this way, the operating convenience and added value of the level is significantly enhanced.

To accomplish the above objective, the present invention provides a laser level, which comprises a top surface and a bottom surface parallel to each other, and a main body to be installed with a plurality of vials. One end of said main body has an integrally extended configuration of a base. Said base is pivotally connected to one end of the connector, while the other end of the connector is bound with a laser module. In this way, the laser module can freely rotate around the pivot between the connector and the base, so as to adjust the projection angle of the laser beam.

DETAILED DESCRIPTION OF THE INVENTION

Figure 1:
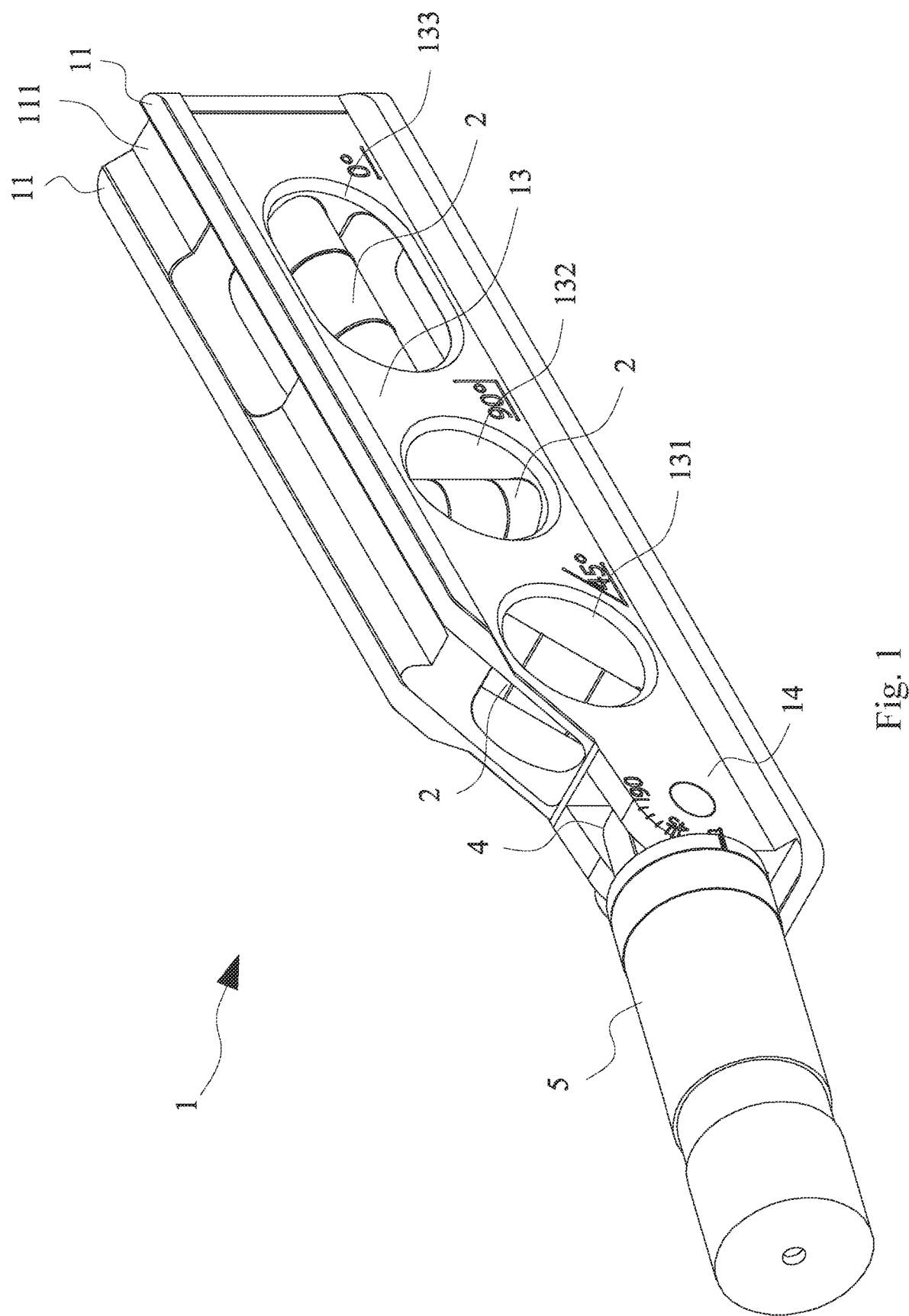
FIG. 1 is a combined perspective view of the laser level of the present invention.
Figure 2:
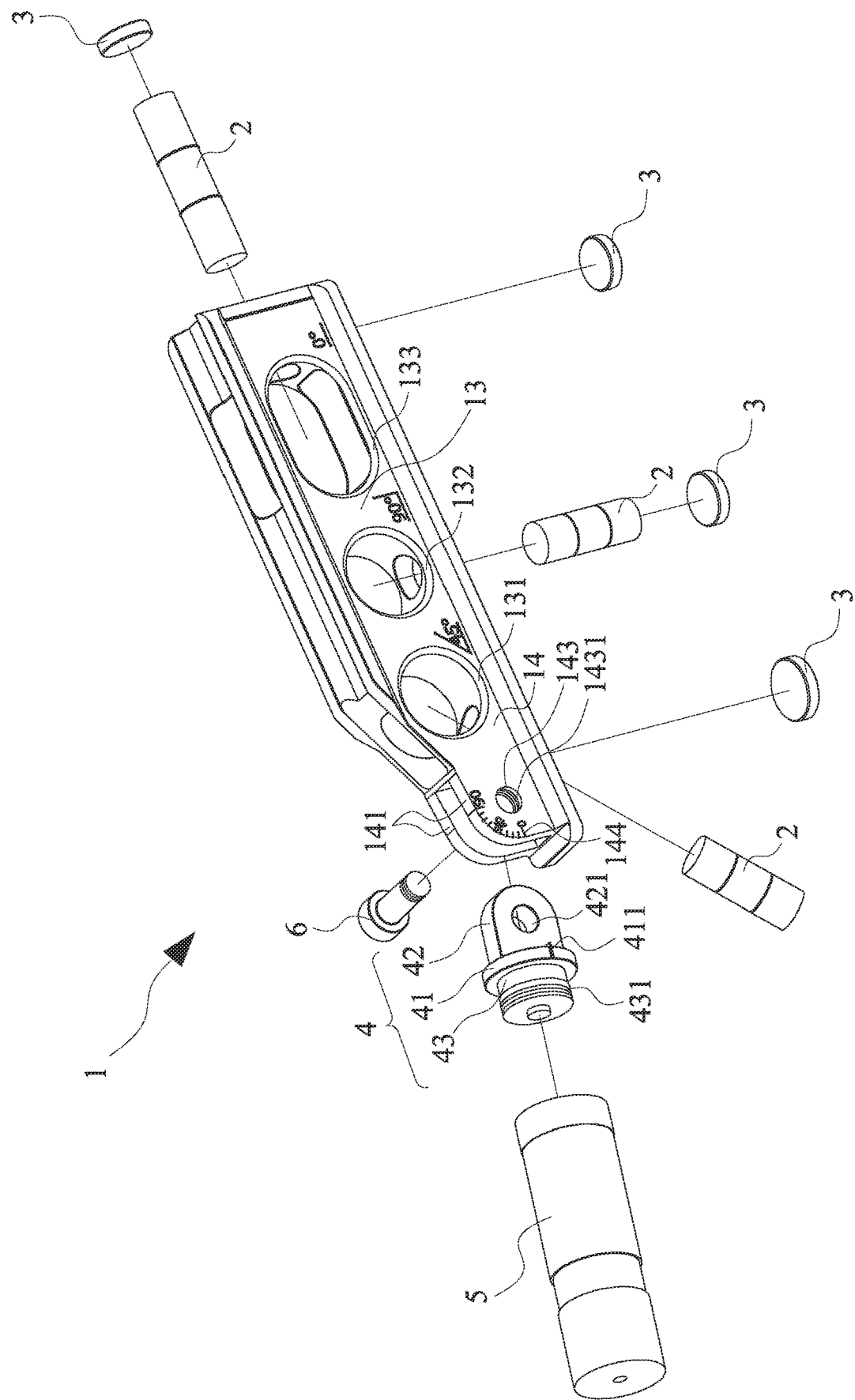
FIG. 2 is an exploded perspective view of the laser level of the present invention.

To help those skilled in the art understand the objective of the present invention, a preferred embodiment of the present invention is described in detail with reference to the accompanying drawings:

Referring to FIG. 1, a combined perspective view of the present invention, and FIG. 2, an exploded perspective view of the present invention, the level 1 comprises a top surface 11 and a bottom surface 12 parallel to each other, and a main body 13 to be installed with a plurality of level vials 2; wherein, the center of the top surface 11 is indented downward to form a V-shape groove 111. The top surface 11 and bottom surface 12 parallel to each other can be used to measure the surface of ground or wall, while the V-shape groove 111 can be used to measure the surface of water pipe or wall corner.

The main body 13 between said top surface 11 and bottom surface 12 has a plurality of apertures to fit the vials 2. In the present embodiment, the first round aperture 131 on the leftmost is to be placed with a 45-degree vial 2, and the second round aperture 132 is to be placed with a 90-degree vial 2, and the oval aperture 133 on the right is to be placed with a 0-degree vial 2. Said vials 2 are placed in the preset positions and are fixed or sealed by means of glue, C-ring (not shown) or magnet 3 after alignment. The basic construction of the above-mentioned level and the means of assembly and fixation of the vials are disclosed in Inventor's U.S. patent Ser. No. 15/286,672 or Chinese Utility Model Patent No. ZL 201621082649.3, and are not detailed herein.

The core features of the present invention are: one end of the main body 13 has an integrally extended configuration of a base 14, and the base 14 is pivotally connected to one end of a connector 4, while the other end of the connector 4 is further fitted with a laser module 5 through bolt joint, so that the laser module 5 can freely rotate around the pivot between the connector 4 and the base 14 to adjust the projection angle of the laser beam.

Figure 3:
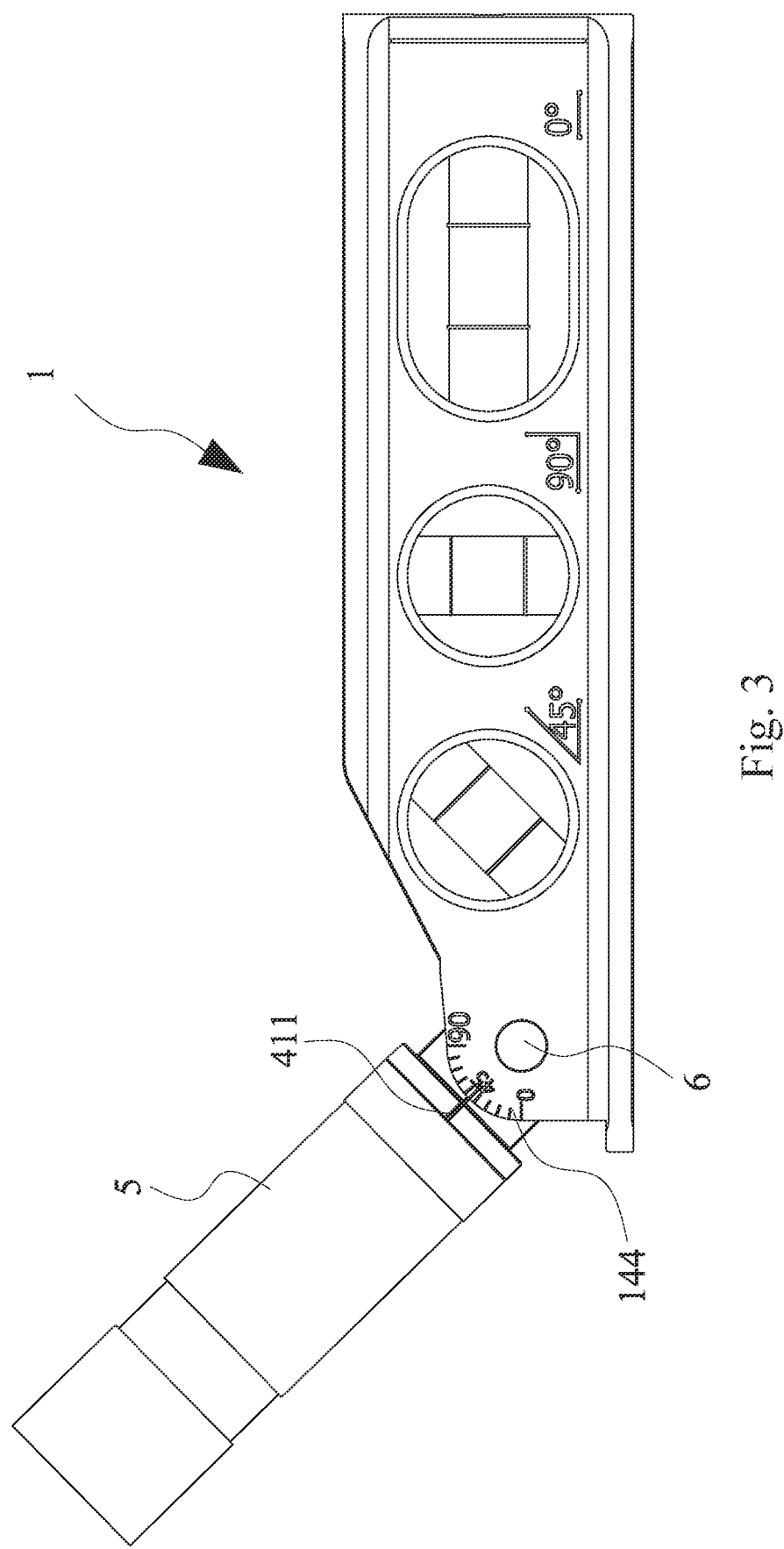
FIG. 3 is a general view when the laser module of the present invention is rotated to 45 degrees.
Figure 4:
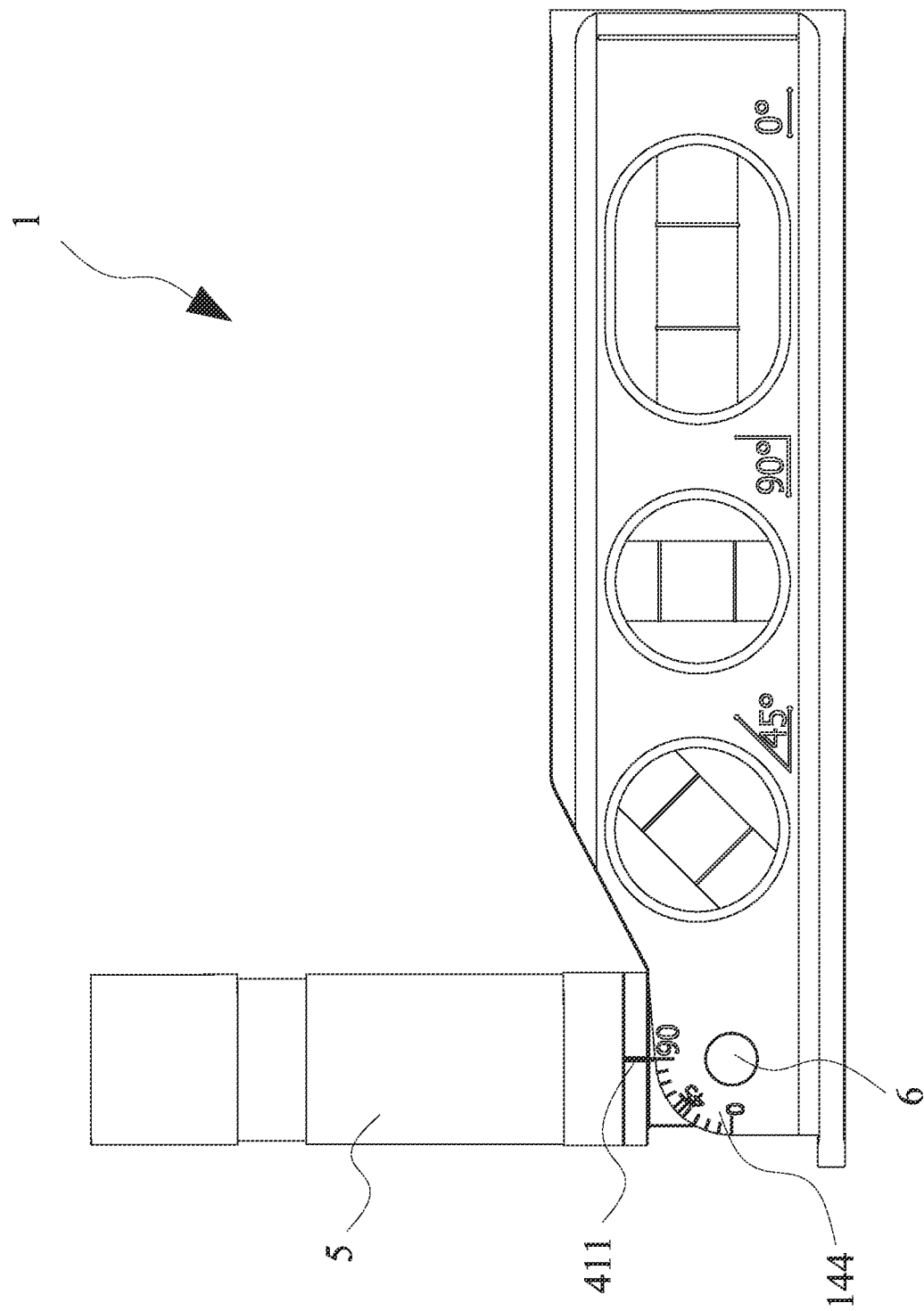
FIG. 4 is a general view when the laser module of the present invention is rotated to 90 degrees.

Said base 14 includes two opposite pivoting walls 141 and an open slot 142; said opposite pivoting walls 141 are configured with symmetric holes 143 and an angle scale 144, and at least one hole is configured with threads 1431; said connector 4 comprises a wheel disc 41, a panel 42 and a column 43; said wheel disc 41 is configured with scale marks 411 to correspond with the angle scale 144 on the pivoting walls of the base; one end of the wheel disc 41 is a panel 42 with configuration of a hole 421; the panel 42 can be inserted into the open slot 142 of the base, while the other end of the wheel disc 41 is a column 43 with configuration of threads 431 to be connected with the laser module 5 through bolt joint. A bolt 6 is used to go through the holes 143 and 421, and fixed on the opposite pivoting walls of the base through the threads 1431. In this way, the laser module 5 is assembled with the base 14 through the connector 4, and the laser module 5 can rotate freely around the axle of the bolt 6 that pivotally connects the connector 4 to the base 14. By aligning the scale marks 411 with the angle scale 144, the required laser beam projection angle can be determined, such as 45 degrees as shown in FIG. 3 or 90 degrees as shown in FIG. 4.

Based on the above design, the laser level enables adjustment of the projection angle of the laser beam as needed. Obviously, this design provides a solution to the problem of conventional levels that the projection angle of the laser beam is limited, and can significantly enhance the operating convenience and added value of the level.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

The invention claimed is:

1. A laser level including a top surface and a bottom surface parallel to each other, and a main body to be installed with a plurality of vials, characterized in that: one end of the level main body has an integrally extended configuration of a base, said base is pivotally connected to one end of the connector, while the other end of the connector is bound with a laser module, so that the laser module can freely rotate around the pivot between the connector and the base to adjust the projection angle of the laser beam.

2. The laser level of claim 1, wherein said base includes two opposite pivoting walls and an open slot, said opposite pivoting walls are configured with symmetric holes.

3. The laser level of claim 2, wherein said base pivoting walls are configured with an angle scale.

4. The laser level of claim 2, wherein at least one hole is configured with threads.

5. The laser level of claim 1, wherein said connector comprises a wheel disc, a panel and a column, said wheel disc is configured with scale marks to correspond with the angle scale of the pivoting wall, one side of said wheel disc is a panel configured with a hole, said panel can be inserted into the open slot of the base, while the other side of said wheel disc is a column configured with threads, for bolt joint with the laser module.

6. The laser level of claim 1, wherein said base and connector are fixed through a bolt going through the symmetric holes of the opposite pivoting walls and the panel hole of the connector, and locked by the threads.

* * * * *